A. GAZAGNAIRE.
GEARING.
APPLICATION FILED APR. 2, 1912.

1,074,710.

Patented Oct. 7, 1913.

Witnesses

Inventor
Adolphe Gazagnaire
Attorney

UNITED STATES PATENT OFFICE.

ADOLPHE GAZAGNAIRE, OF CANNES, FRANCE.

GEARING.

1,074,710.  Specification of Letters Patent.  Patented Oct. 7, 1913.

Application filed April 2, 1912. Serial No. 688,044.

*To all whom it may concern:*

Be it known that I, ADOLPHE GAZAGNAIRE, citizen of the Republic of France, residing at 56 Rue d'Antibes, Cannes, Alpes-Maritimes, France, have invented certain new and useful Improvements in Gearing, of which the following is a specification.

This invention has reference to a system for controlling a body in motion (more particularly electric lifts and the like) and permits of communicating to the latter variable speeds, increasing to normal speed or decreasing from normal speed to the stoppage of the lift. These variations of speed may be progressive or intermittent and are effected by intermediation of transforming mechanism dependent mechanically or electrically on the movement of the engine and which transforming mechanism is connected to any suitable change-speed mechanism which is thus automatically operated.

The accompanying drawing shows one application of the system to an electric lift.

Figure 1:
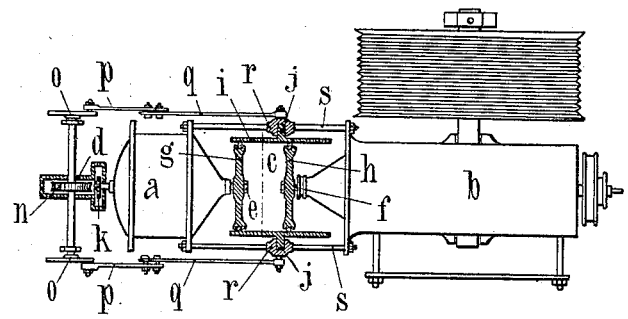
Figure 2:
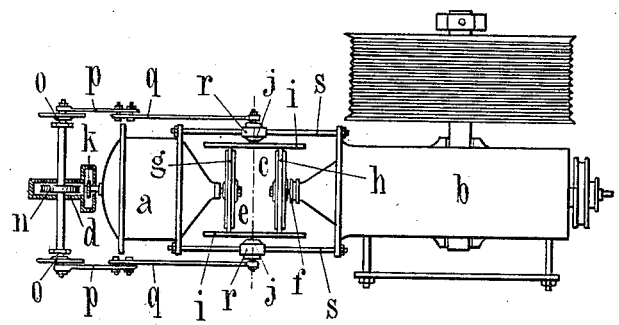
Figure 3:
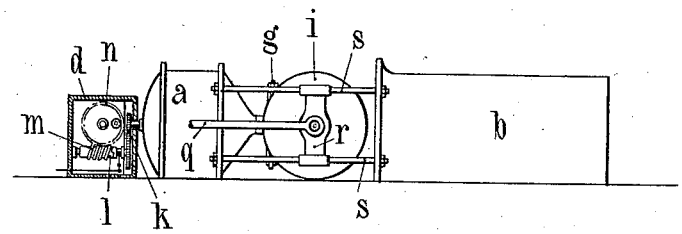

Figure 1 is a plan view of the control mechanism. Fig. 2 is a similar view, the parts being displaced so as to produce a different speed of the moving body. Fig. 3 is an elevation.

The mechanism shown in the drawing has been devised particularly for complying with the following conditions: very smooth starting, very smooth stoppage, exact stoppage whatever may be the speed and the weight carried. By this mechanism the power required for starting is practically equal to that necessary for maintaining normal speed, or greater than that by $\frac{1}{10}$th to $\frac{1}{4}$th at most. For this purpose a change-speed mechanism $c$ (shown in the drawing as of the progressive type, but which may be stepped as in automobiles) is arranged between the driving mechanism $a$ and the driven mechanism $b$, in the present case the winch actuating the movable body. This change-speed mechanism is actuated in any suitable manner by intermediation of a transforming mechanism $d$ controlled by the movement of the engine itself.

Metal disks $g$ and $h$ carrying an outer friction rim formed by leather disks standing on edge and tightly pressed together or by any other suitable friction means, are mounted on the shaft $e$ of the engine $a$ and on the driven shaft $f$. The movement of the driving disk $g$ is transmitted to the driven disk $h$ by intermediation of two friction plates $i$ mounted loose in bearings $j$ which can move the plates in the one or the other direction. A spring device, not shown in the drawing, keeps the plates $i$ pressed against the disks $g$ and $h$ so as to cause them to adhere sufficiently to be rotated by the latter. On the other hand this contact can be interrupted by any suitable mechanism for the purpose of disconnecting the transmission mechanism.

In the example shown in the drawing the displacements of the plates $i$ progressively increase or decrease according as their axis is removed from or approaches to the middle plane parallel to the planes of the driving disk $g$ and the driven disk $h$. For this purpose the driving shaft $a$ by means of suitable gearing $k$ and a suitable clutch $l$, controls an endless screw $m$ meshing with a worm wheel $n$. Crank disks $o$ of adjustable eccentricity are mounted on the shaft of the wheel $n$ and act on connecting rods $p$ which by intermediation of the rods $q$ cause the slides $r$ to move along the guides $s$; the shafts $j$ of the intermediate friction plates $i$ are rotatably mounted in the slides $r$. The driving of the reducing gearing $k$ can be effected by an auxiliary relay engine and from what has just been stated it will be seen that the ratio of the driving and driven speeds progressively changes until attaining in the one direction of the movement the normal speed, and in the other direction the lowest speed permitting the stoppage of the movable body. Under these conditions a very smooth starting is obtained and the intensity of the current remains practically equal to that existing when the movable body is traveling at normal speed, inasmuch as the engine starts under no load and is only connected up for producing an effort decreased in the ratio of the driving radii of the change-speed mechanism. The speed is progressively modified up to the normal speed, the maximum speed being attained for a half revolution of the crank disks. At this moment a regulator or electric contact can disconnect the system if the normal speed has to be maintained for a certain time. On reaching a certain distance from the spot at which it is desired to stop, an electric contact connects up the clutch $l$ so that the movement of the engine, by intermediation of connecting rods and cranks, returns the friction plates $i$ into their initial position by moving them in an opposite direction, reducing the speed of the movable body.

The arrangement works as follows:—A press-button provided in the cage is pushed in and owing to a switch-board switches on the engine $a$ while at the same time electromagnets release the brakes of the winch and the engine. The latter having been started under no load, the clutch $l$ is then connected up by any suitable means and the friction plates $i$ are rotated by the engine until obtaining the normal speed, passing through values determined by the suitable choice of the transmission mechanism. The transmission $d$ is then disconnected from the engine $a$. In order to obtain the stoppage at a pre-determined distance from the starting spot, the clutch $l$ transmitting the movement of the engine $a$ to the change-speed transmission mechanism $d$ controlling the change-speed gearing is connected up so that the speed is diminished until the lowest speed is obtained. The current is then switched off and the mechanism uncoupled. When descending the same operations occur in reverse order.

Claims:

1. In a control mechanism for a body in motion, the combination of a pair of friction disks; driving means for one of the disks; friction plates each engaging an edge of both disks; slidable means for supporting the plates; a pair of cranks; a rod connecting each crank to one of the sliding means; a connection between the cranks and the driving means for slowly revolving the cranks; and a clutch in said connection.

2. In a control mechanism for a body in motion, the combination of oppositely disposed friction disks; a driving means for driving one of the disks; slides at opposite edges of the disks; friction plates carried by said slides; a pair of cranks; links connecting the respective cranks with the slides; and an operative connection between the driving means and the cranks for revolving the cranks at a slow speed and including a clutch.

3. In a control mechanism for a body in motion, the combination of a driving shaft; a driving disk thereon; a driven disk parallel to the driving disk; guides on opposite sides of said shaft; slides on the guides; plates rotatably mounted on said slides respectively and engaging the disks; a worm screw; a clutch device connecting the screw with the driving shaft; a worm wheel engaged by said screw; cranks rotated by said wheel; and links connecting the respective cranks to said slides.

4. In a control mechanism for a body in motion, the combination of a driving shaft; a driven shaft in alinement therewith; a friction disk on the driving shaft; a friction disk on the driven shaft; a pair of guides on opposite sides of said shafts; slides provided on said guides respectively; friction plates rotatably mounted on said slides respectively and pressed against opposite sides of said disks; a worm geared to said driving shaft and provided with a clutch therebetween; a worm wheel engaging said screw; a wheel shaft supporting said worm wheel and parallel to the axis of said plates; disks at opposite ends of said shaft and each provided with an eccentric crank pin; and adjustable links connecting the respective crank pins with the adjacent slides.

In testimony whereof I affix my signature in presence of two witnesses.

ADOLPHE GAZAGNAIRE.

Witnesses:
CHARLES BRASHEARS BEYLARD,
JOSEPH VAN DAM.

Copies of this patent may be obtained for five cents each, by addressing the "Commissioner of Patents, Washington, D. C."